Figure 1:
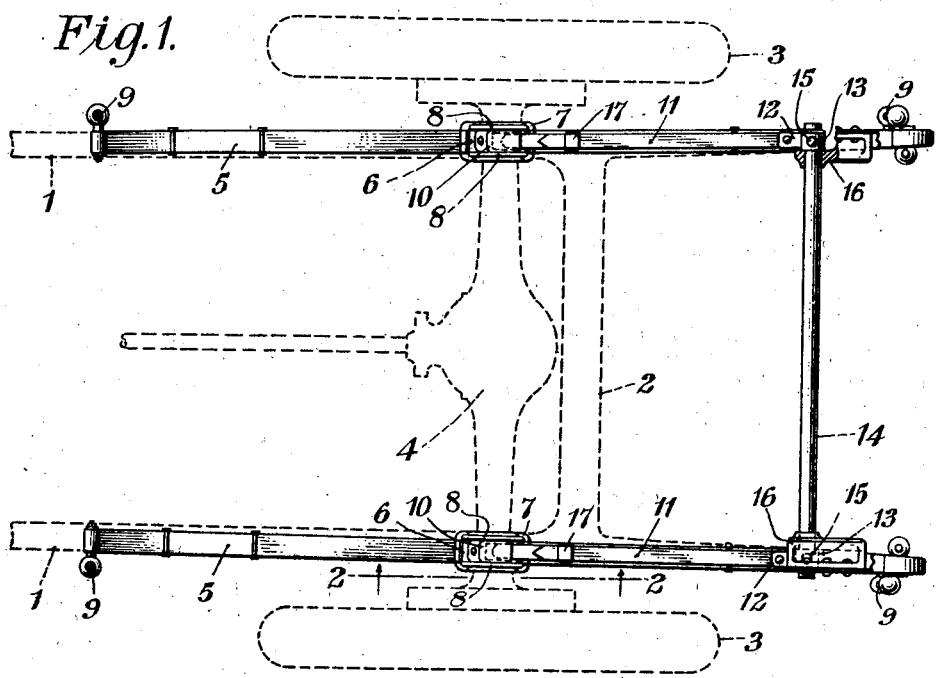

Jan. 5, 1926.  
W. E. GOYNE  
SPRING SYSTEM FOR VEHICLES  
Filed Feb. 10, 1921

1,568,551

William E. Goyne INVENTOR,
BY Walter J. Gill ATTORNEY

Patented Jan. 5, 1926.

1,568,551

UNITED STATES PATENT OFFICE.

WILLIAM E. GOYNE, OF BROOKLYN, NEW YORK.

SPRING SYSTEM FOR VEHICLES.

Application filed February 10, 1921. Serial No. 443,957.

*To all whom it may concern:*

Be it known that I, WILLIAM E. GOYNE, a citizen of the United States, residing at Brooklyn, in the county of Kings, State of New York, have invented certain new and useful Improvements in Spring Systems for Vehicles; and I do hereby declare the following to be a full, clear, and exact description of the invention, such as will enable others skilled in the art to which it appertains to make and use the same.

This invention relates to spring systems for eliminating the effect upon vehicles of irregularities in the road and taking care of overloads.

A great number of arrangements have been proposed for absorbing shocks in vehicles due to irregularities in the road and other causes and many of them have gone into more or less extensive use, but all of these arrangements, so far as I am aware, depend upon devices which are connected to the chassis or other part of a vehicle on the same side as the wheel which is subject to shock. The shock absorbing devices usually depend upon the use of springs or fluid pressure, and in many cases accurate and frequent adjustments are necessary, together with replenishing of the fluids, in case the devices make use of the flow of liquid from one compartment to another or upon the motion of a member through a liquid within a receptacle, to overcome the effect of shocks.

The standard leaf spring now universally employed in vehicles is at best a mechanical compromise and does not completely take care of both light and heavy shocks on the vehicle and changes in the load carried by the vehicle. If the spring is designed to take care of the shocks to which a vehicle may be subject when passing over rough roads, it will be too rigid for comfortable riding when passing over smooth roads, while if it is designed to give easy riding upon the latter kind of roads, it will not be sufficiently strong to properly absorb the shocks when the vehicle is passing over rough roads. It is impracticable to attempt to alter the strength of the spring according to the character of the roads and changes in the load in the vehicle. In practice, therefore, the spring is designed to give the most efficient service under ordinary road conditions and with an average load, but cannot properly take care of both extreme conditions and widely varying loads.

It appears from the above considerations that if an arrangement could be provided which would be effective to properly reinforce the main springs of the vehicle while passing over rough roads, but which would exert little or no effect when passing over smooth roads, the flexibility of the main springs could be increased to a degree to give most comfortable riding under the last named conditions.

It is accordingly an object of this invention to provide an arrangement for this purpose which will reinforce the main springs of a vehicle and absorb shocks when the vehicle passes over irregularities. Instead, however, of transmitting the shock to a part of the vehicle lying adjacent to the wheel which is subject to shock due to elevations or depressions in the road, the arrangement provides for transferring part of the shock to a part of the vehicle distant from the wheel where it may be dissipated. The part of the vehicle to which the shock is transferred is preferably the opposite side, so that the lateral stability of the vehicle is increased and tipping and jarring due to irregularities in the road are reduced and the vehicle rides more evenly and comfortably. Not only does the arrangement diminish the effect of shocks caused by elevations in the road, but, if the vehicle passes over a depression, the reverse operation of the mechanism will tend to prevent the wheels from rapidly dropping to the bottom of the depression and thus lessen the jolt upon the vehicle.

Vibrations of a choppy nature are frequently experienced when riding over cobble stones or other small irregularities, in a vehicle equipped with certain types of friction shock absorbers, or where the free action of the springs is constricted. The short rapid movements imparted to the axle when travelling over small irregularities or cobble stones are transmitted more directly to the chassis due to the fact that in devices of this type the parts cannot be adjusted to counteract this tendency and at the same time give the resistance needed to meet conditions encountered when passing over rough roads.

Figure 2:
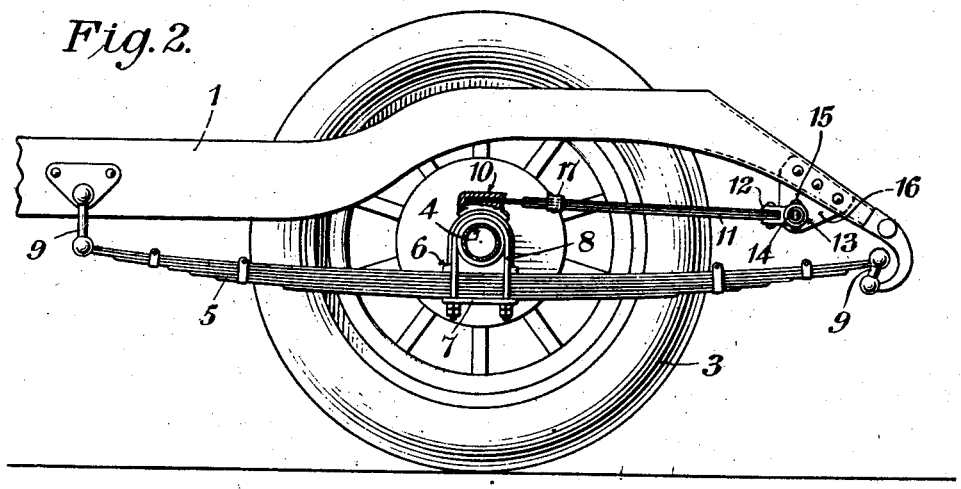
Figure 3:
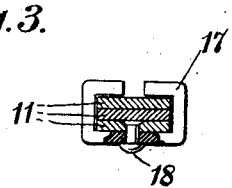

The particular nature of the invention as well as other objects and advantages thereof will appear more clearly from a description of a preferred embodiment as shown in the accompanying drawing in which Fig. 1 is a plan view of a part of an automobile with the invention applied thereto, Fig. 2 is an elevation taken in section along the line 2—2 of Fig. 1, Fig. 3 is a sectional view of one of the arms of the device showing the clip thereon.

In the drawing 1—1 represents the side frames of the chassis, which are connected by a cross-bar 2, these parts, together with the wheels 3 and axle 4, being shown in broken lines in Fig. 1 in order to simplify the drawing. A main spring 5, in the form of a semi-elliptical leaf spring, is connected to each end of the axle near the corresponding wheel in any suitable manner, as by being clamped between a block 6 and a plate 7 by a U-bolt 8. Each spring is connected to its corresponding side frame 1 by links 9 in the usual manner.

In accordance with this invention there is attached to each block 6 a member 10 provided with a recess within which the end of a resilient arm 11 is closely but slidably fitted so that it may move longitudinally within the recess but is restrained from transverse movement. Each arm is preferably made up of a number of leaves in a manner similar to that of the main springs, except that the leaves normally have no curvature. The other end of each arm is permanently fastened between the bifurcated portion 12 of a collar 13 which is fixed upon a shaft 14 by a pin 15. The shaft extends transversely of the vehicle and is carried upon the chassis by brackets 16 attached to the inner faces of the side frames. The collars 13 are attached to the shaft 14 immediately outside of the brackets, as shown most clearly in Fig. 1, thereby preventing any longitudinal movement of the shaft.

Any sidewise displacement of the central leaves of the arms 11 is prevented by the vertical sides of the recesses in the members 10. It is also necessary to prevent any danger of the other leaves of the arms from being accidentally displaced sidewise with possible injury to themselves or to other parts of the vehicle. For this purpose a clip 17 is attached to the lower leaf, as by means of a rivet 18, and surrounds the arm, as shown most clearly in Fig. 3, with sufficient clearance above the upper leaf to permit the leaves to move relatively to each other when the arm is flexed, while causing both the upper and lower leaves to partake of the bending of the central leaf. Were it not for this arrangement one or the other of the outer leaves would be ineffective upon flexure of the arm since the central leaf and the other leaf would bend away from it.

For any particular vehicle, the weight of the main springs may be considerably reduced, thereby increasing the flexibility of the sustaining spring system and causing a greater initial deflection of these lighter weight springs with the same load. The arms 11 will be so designed and attached that they will have substantially no flexure when the main springs are compressed and under normal load. This arrangement will give greater resiliency to the vehicle when it is passing over slight irregularities and yet be sufficiently stiff to resist the larger movements of the wheels.

When a wheel of a vehicle equipped with the invention passes over an elevation, the sudden upward movement imparted to the wheel tends to produce a corresponding upward movement of the chassis and vehicle body, which tendency is partially resisted by the resiliency of the main springs and the inertia of the vehicle. At the same time there will be a sudden flexure of the arm 11 located adjacent to the wheel which is subject to shock as the axle moves upward toward the chassis. This flexure of one of the arms will through the shaft 14 tend to produce a corresponding flexure of the arm on the other side of the vehicle and thereby lift this side of the vehicle from the ground. This tendency will, however, be resisted by the weight of the vehicle with the result that the effect of the shock is dissipated by the energy expended in flexing the arms and tending to lift the other side of the vehicle. Not only will the absorption of the shock be manifest by a lessened jolt upon the occupants of the vehicle, but the tilting effect upon the body of the vehicle as the wheel passes over the elevation will be eliminated, thus causing the vehicle to ride evenly and comfortably over all irregularities in the roadway.

Considering now the action of the device when a wheel of the vehicle passes into a depression, it will be seen that the tendency for the wheel to fall into the depression will be resisted by the arm 11 on the same side of the vehicle, for the downward flexure of the arm will be opposed by the arm on the opposite side of the vehicle with the result that the wheel will be delayed or even prevented from dropping to the bottom of the depression and will contact with the other side of the depression and roll to the top of the latter with less jar upon the vehicle than if the wheel had fallen to the bottom of the depression. The reduced movement of the wheel will be accompanied by a lessened tilting of the vehicle as the wheel passes over the depression.

The above explanation relates particularly to the operation of the device when there is a relative displacement in a vertical direction between the chassis and one of the wheels independently of the other wheel on the same axle. When there is a substantially equal change in the normal relation between each wheel and the chassis, as occurs when both wheels are displaced with respect to the chassis by substantially the same amount due to the passage of the vehicle over an elevation or a depression, or as also occurs when the chassis is overloaded and approaches the axle, both of the arms 11 will be flexed on account of the resistance offered by the close fit of the ends of the arms within the recesses of members 10. The resistance offered by the arms to such flexure will oppose the displacement between the chassis and wheels and thus lessen the shock imparted to the vehicle as the wheels pass over an irregularity and will also damp out the subsequent vibrations of the vehicle. In the case of an overloaded chassis the arms will then reinforce the main springs and carry part of the overload. Were it not for the tight, but slidable fit of the ends of the arms 11 within the recesses in members 10, the shaft 14 would be simply rocked in its bearings, under the above conditions, without causing any flexure of the arms.

It will be seen from the above description of the operation of the device under various conditions that the flexure of the arms performs the following functions: It resists the upward or downward movement of either or both of the wheels; resists any abnormal depression from overload of the entire chassis or only one side thereof and resists the rebound or tendency of the main springs to assume their natural camber after a sudden shock.

Not only will the device lessen or prevent the tendency for the chassis and body to rebound due to shocks imparted to the vehicle as it passes over elevations or depressions by tending to hold these parts down to their normal position with respect to the axle, but it will quickly damp out any subsequent vibrations that may tend to occur, particularly after passing at high speed over irregularities in the road.

It will thus be seen from the above description of the invention that when it is used in connection with the main springs of a vehicle it constitutes a shock controller, absorber or eliminator, performs the functions of a snubber and chassis rebound controller, acts as an auxiliary for taking care of overloads, and restricts or dampens downward movements of the wheels when passing over depressions. The invention thus takes care of all of the factors which produce the uncomfortable effects experienced when riding in an automobile, and yet it is simple in construction and operation, contains no mechanism requiring frequent adjustment during service and increases the life of a vehicle.

While for purpose of illustration the invention has been shown as applied to a vehicle provided with longitudinal main springs of the leaf type, it may by simple modifications of the structure be applied to vehicles having transverse main springs, or to vehicles having springs of other types. It is expected that the invention will find its greatest field of usefulness in connection with automobiles, trucks and the like, but it is not limited in its application to such vehicles, and may with advantage be applied to other types of vehicles, such as railroad rolling stock in which side roll and sharp vibrations may be caused by irregularities in the tracks upon which the vehicles travel, thereby prolonging their lives and increasing the comfort of their occupants.

The invention may also be embodied in other forms of mechanism than that shown and may be employed in connection with the various shock absorbing devices now in general use by connecting movable parts of the devices to members which will control and absorb the shocks by distributing them to other parts of the vehicle than those immediately affected.

While the invention has been shown as embodied in a device having a pair of arms connected to the ends of the axle on each side of the vehicle, it will be understood that the number of arms may be increased or that they may be connected to intermediate points of the axle, or even to other parts of the vehicle, without departing from the principle of the invention as defined in the appended claims.

I claim:

1. In a vehicle having a pair of wheels, an axle therefor and a chassis supported upon the axle by main springs, the combination of a plurality of resilient members, means independent of the main springs and movably mounted in the chassis to which one end of each of the members is connected and means associated with the free ends of the members and a part of the vehicle for causing resistance to flexure of the members when there is a substantially equal change in the normal relation between each wheel and the chassis of the vehicle.

2. In a vehicle having a pair of wheels, an axle therefor and a chassis supported upon the axle by main springs, the combination of a plurality of resilient members, means independent of the main springs and movably mounted in the chassis to which one end of each of the members is connected and means associated with the free ends of the members and the axle for causing resistance to flexure of the members when there is a substantially equal change in the normal relation between each wheel and the chassis of the vehicle.

3. In a vehicle having a pair of wheels, an axle therefor and a frame supported upon the axle by main springs, the combination of a plurality of resilient members, means movably mounted in the frame and to which one end of each of the members is connected and devices mounted upon the axle and provided with recesses within which the other ends of the members are closely but slidably fitted for causing resistance to flexure of the members when there is a substantially equal change in the normal relation between each wheel and the frame of the vehicle.

4. In a vehicle having a pair of wheels, an axle therefor and a chassis supported upon the axle by main springs, the combination of a member independent of the main springs and movably mounted in the chassis, a plurality of resilient elements, each having one end connected to the member and means associated with the other ends of the elements and a part of the vehicle for causing them to resist changes in the normal relation between the chassis and both wheels.

5. In a vehicle having a pair of wheels, an axle therefor and a chassis supported upon the axle by main springs, the combination of a member independent of the main springs and movably mounted in the chassis, a plurality of resilient elements, each having one end connected to the member and means connecting the free ends of the elements to the axle for causing them to resist changes in the normal relation between the chassis and both wheels.

6. In a vehicle provided with an axle, a chassis supported upon the axle by main springs and a plurality of resilient elements connected to each other by a member independent of the main springs and movably mounted in the frame of the vehicle, the combination of means for connecting the elements to a part of the vehicle to prevent rolling motion of the vehicle and to resist a substantially equal change in the normal relation between each wheel and the frame of the vehicle.

7. A spring system for vehicles comprising a plurality of arms each composed of a number of leaves of different lengths, devices attached to an axle of the vehicle adjacent to its wheels and within which the extended ends of the longest leaves of the arms are closely but slidably fitted and means movably mounted in the chassis of the vehicle to which the other ends of the arms are connected.

8. In a vehicle provided with a plurality of resilient elements each connected at one end to a member movably mounted in the frame of the vehicle, the combination of means connecting the other ends of the elements to an axle of the vehicle to cause resistance to flexure of the members when the normal relation between the frame and both wheels is changed while resisting rolling motion of the vehicle due to changes in the normal relation between the frame and one of the wheels.

9. A spring system for vehicles comprising a plurality of resilient arms, a plurality of members attached to the axle of the vehicle and provided with recesses into which one end of each arm is closely but slidably fitted, and a member movably mounted in the frame of the vehicle and to which the other ends of the arms are attached.

10. In a vehicle having a pair of wheels, an axle therefor and a frame supported upon the axle by main springs, the combination of a plurality of substantially horizontal resilient members, means independent of the main springs and movably mounted in the frame and to which one end of each of the members is connected and devices for connecting the other ends of the members to the axle to cause resistance to flexure of the members when there is a substantially equal change in the normal relation between each wheel and the frame of the vehicle.

11. In a vehicle having a pair of wheels, an axle therefor and a frame supported upon the axle by main springs, the combination of a plurality of resilient members, means movably mounted in the frame and to which one end of each of the members is connected, and devices connected to the axle with which the other ends of the members have sliding engagement longitudinally but are prevented from moving laterally with respect to the axle.

12. In a vehicle having a pair of wheels, an axle therefor and a frame supported upon the axle by main springs, the combination of a plurality of resilient members, means movably mounted in the frame and to which one end of each of the members is connected and devices connected to the axle with which a substantial portion of the other end of each member is in sliding engagement in the direction of its length.

13. In a spring system for vehicles, the combination of a plurality of resilient arms, a connection between one end of each arm and a part of the vehicle for permitting longitudinal movement of the arm with respect to the connection while preventing transverse movement of the end of the arm and a member movably mounted in the frame of the vehicle to which the other ends of the arms are attached.

14. In a spring system for vehicles, the combination of a plurality of resilient members, devices connected to the axle of the vehicle and engaging a substantial portion of one end of each arm while permitting longitudinal movement of the arm with respect to the device and a member movably mounted in the frame of the vehicle to which the other ends of the resilient arms are attached.

In testimony whereof I affix my signature.

WILLIAM E. GOYNE.